United States Patent Office 2,935,414
Patented May 3, 1960

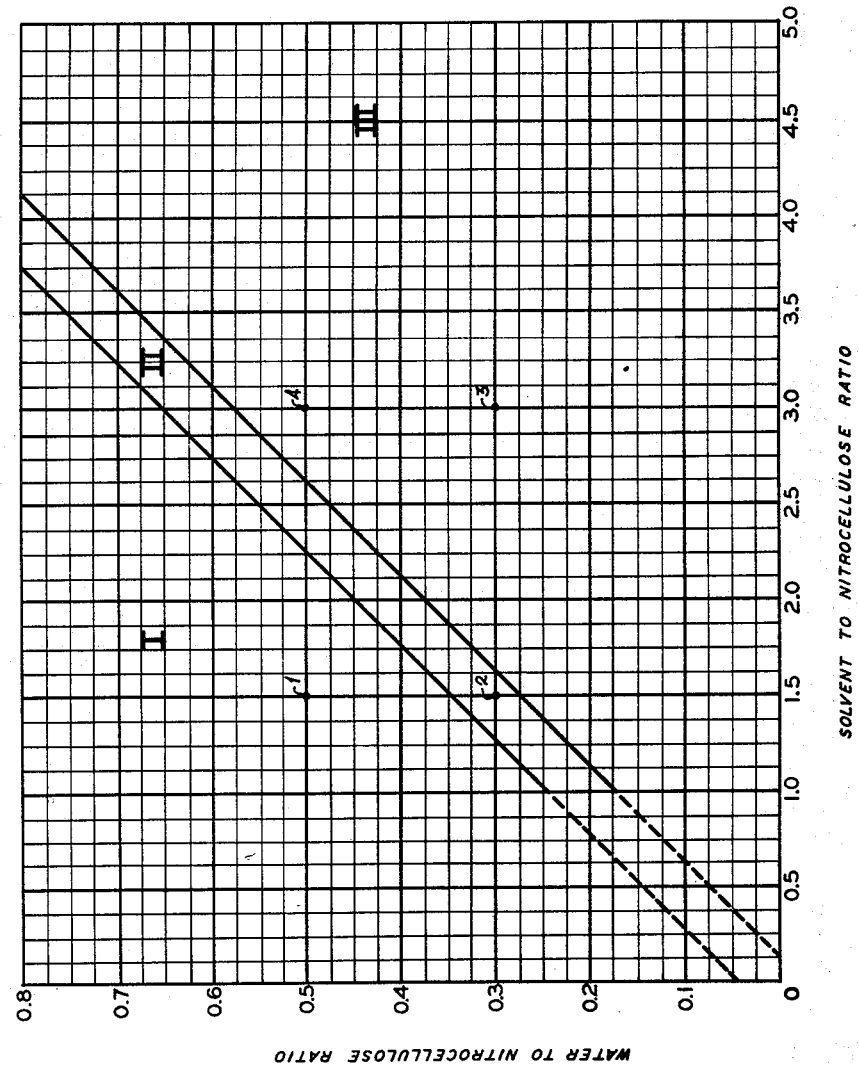

2,935,414

NITROCELLULOSE LACQUERS

Ralph L. Cook, Alton, Ill., and Eugene A. Andrew, Berkeley, Mo., assignors to Olin Mathieson Chemical Corporation, East Alton, Ill., a corporation of Virginia Application May 22, 1958, Serial No. 737,084

5 Claims. (Cl. 106—183)

This invention relates to nitrocellulose lacquers and particularly to a method of minimizing the water content thereof.

In the manufacture of globular propellant powder by the solidification of nitrocellulose droplets while suspended in a non-solvent medium as described in U.S. 2,740,704 and 2,740,705 granted April 3, 1956 to John J. O'Neill, Jr. and Gilbert R. Cox, the lacquer is usually prepared from fibrous nitrocellulose containing between about 20% and 40% water. This lacquer is most conveniently made from water wet nitrocellulose because the nitrocellulose is commercially available only in that form. In fact, government specifications require that fibrous nitrocellulose in shipment contain at least 20% water as a safety measure. Such water wet nitrocellulose can be readily dissolved in water immiscible nitrocellulose solvents to provide a homogeneous lacquer from this a suitable propellent powder can be prepared by complete dissolution processes.

If the water is not removed from the nitrocellulose or from the lacquer prepared therefrom, the resultant globular powder has an objectionably low gravimetric or packing density because of excessive porosity. Thus, in practice, water is removed from the suspended lacquer particles by adding a solute to the non-solvent suspending medium as taught by Schaefer in 2,160,626. This process successfully removes water from the suspended nitrocellulose lacquer particles before they are hardened into globular grains but the time of dewatering when using water wet nitrocellulose is quite lengthy, particularly when large diameter grains are being prepared. This problem becomes particularly important in the manufacture of grains having a diameter in the neighborhood of 0.1 inch or greater. In addition, since the water content of commercially fibrous nitrocellulose varies between about 20% and 40%, the time for dewatering also varies. Such variation necessitates periodic sampling and militates against a uniform operational procedure.

It is, therefore, an object of this invention to provide a novel method for the removal of water from nitrocellulose lacquers prepared from water wet nitrocellulose. Another object of this invention is to prepare nitrocellulose lacquers having a uniform water content from water wet nitrocellulose containing varying degrees of water. A more specific object of this invention is to provide a method of preparing water immiscible nitrocellulose lacquers particularly advantageous for use in the manufacture of globular propellant powder by the processes of U.S. Patents 2,740,704 and 2,740,705.

In accordance with this invention, these and other objects are achieved, generally speaking, by preparing a lacquer from nitrocellulose wet with more than about 20% water in a water immiscible nitrocellulose lacquer and reducing the solvent-to-nitrocellulose ratio until water is separated or precipitated from the lacquer as a separate phase. The water phase is then separated from the lacquer, preferably by decanting. This invention is predicated on the discovery that the compatibility of water in a system containing water, nitrocellulose, and a water immiscible nitrocellulose solvent, is a function of the concentration of the nitrocellulose in the system. Thus, when a relatively dilute nitrocellulose lacquer is prepared from water wet nitrocellulose, the resultant lacquer is a homogeneous one-phase system in which the water is uniformly incorporated. However, when the concentration of the nitrocellulose in the lacquer is increased, water is precipitated therefrom in amounts relatively proportional to the concentration of the lacquer.

The invention is most specifically concerned with the preparation of lacquers from nitrocellulose containing between about 20% and 40% water. In other words, the water-to-nitrocellulose ratio of the lacquer is between about 0.25 and about 0.66. Since the water removal is generally proportional to the concentration of the nitrocellulose in the lacquer, best results are obtained when the lacquer is highly concentrated. Theoretically, optimum results would be obtained when only a modicum of solvent was used to dissolve the nitrocellulose. In actual practice, however, when the ratio of the solvent-to-nitrocellulose in the lacquer is reduced to about 1.5:1, a very heavy dough-like lacquer is obtained from which a major portion of the water is precipitated. More concentrated lacquers are exceedingly heavy and difficult to work. Therefore, it is preferred not to utilize heavier lacquers in accordance with this invention. However, with special equipment, it is possible to obtain a lacquer in which the ratio of the solvent-to-nitrocellulose is in the neighborhood of about 1:1. Thus, the present invention encompasses the utilization of lacquers having this composition. Theoretically, the solvent content could be further reduced but actually incomplete solvation of the nitrocellulose is probably obtained when the amount of solvent in the lacquer is less than the nitrocellulose.

The nitrocellulose lacquer utilized in accordance with this invention must be substantially immiscible with water. While some mutual solubility of the water and solvent can be tolerated, it must be sufficiently small so that the water and lacquer are capable of forming a two-phase system. It is preferred to use ethyl acetate as the solvent in the process of this invention but other water immiscible nitrocellulose solvents such as methyl ethyl ketone to which toluene has been added and isopropyl acetate can also be employed. The nitrocellulose solvent must also be more volatile than water to facilitate the removal of the solvent in the manufacture of globular powder grains since the subsequent hardening operation is carried out in an aqueous suspending medium.

The solvation of the nitrocellulose and the subsequent removal of the water therefrom can be carried out at any temperature at which water and the solvent are in the liquid state. The solubility of water in a non-solvent may vary with the non-solvent system; however, even in a system where solubility increases with temperature, it is preferred to separate at a temperature slightly below the boiling point of the particular solvent being used in order that a minimum of this solvent be employed to give a workable lacquer.

In practice, the advantages of this invention are most readily achieved by adding nitrocellulose to a water immiscible nitrocellulose solvent and continuing the addition and solution of the nitrocellulose until a lacquer having a solvent-to-nitrocellulose ratio of about 1.5:1 is obtained. This results in the formation of a lacquer phase and a water phase which can be readily separated by any suitable means. After the water phase has been removed, the heavy lacquer is then diluted by the addition of solvent until a lacquer of the desired concentration is obtained.

The invention will be more readily understood from the following preferred embodiment taken in connection with the accompanying drawing which is a graphic presentation of the compatibility of water-ethyl acetate-nitrocellulose lacquers. All proportions throughout the specification and in this embodiment are given in parts by weight.

In the drawing, the solvent-to-nitrocellulose ratio has been plotted against the water-to-nitrocellulose ratio. The solvent-to-nitrocellulose ratio shows the concentration of the nitrocellulose in the lacquer, while the water-to-nitrocellulose ratio gives the water content of the nitrocellulose used in making up the lacquer. Lacquers having compositions within area III of the graph are single phase homogeneous systems which will retain their water content, while lacquers having compositions within area II of the graph are water saturated and begin to precipitate water therefrom. However, when the lacquers are concentrated sufficiently for their compositions to fall within area I of the graph, water separates from them as a separate phase and can be very readily removed.

As a specific example, about 100 pounds of fibrous nitrocellulose wet with about 50 pounds of water were mixed with about 150 pounds of ethyl acetate at a temperature of about 65° C. The water-to-nitrocellulose ratio was then 0.5:1 and the ethyl acetate-to-nitrocellulose ratio was about 1.5:1. The composition of the mixture is plotted as point 1 on the graph. Point 1 is in area I and thus the resultant lacquer will not tolerate all of the water contained in the nitrocellulose. From the graph, it is evident that a lacquer having a solvent-to-nitrocellulose ratio of 1.5:1 will hold only 0.3 parts of water for each part of nitrocellulose. Thus, 20 pounds of water were expelled as a separate phase and the resultant lacquer is represented as point 2 on the graph.

After the water phase was separated from this lacquer, the lacquer was diluted with an additional 150 pounds of ethyl acetate to give a lacquer having an ethyl acetate-to-nitrocellulose ratio of 3:1 and a water-to-nitrocellulose ratio of only 0.3:1. The composition of this lacquer is shown at point 3 on the graph. It will be noted that this lacquer contains only 30 pounds of water. By contrast, if this same lacquer were prepared from the same components by adding the nitrocellulose to the ethyl acetate until a lacquer having an ethyl acetate-to-nitrocellulose ratio of about 3:1 was obtained, all of the water originally associated with the nitrocellulose would be contained in the lacquer. The composition of a lacquer prepared by this method is designated as point 4 on the graph. It will be noted that this latter lacquer contains ½ part of water for each part of nitrocellulose, or 20 pounds more water than does the lacquer indicated at point 3 on the graph. Thus, by the simple expedient of increasing the solvent-to-nitrocellulose ratio to about 1.5:1 and then diluting, 40% of the water originally associated with the water wet nitrocellulose has been eliminated from the system.

Globular propellent powder having an average diameter of about 0.100 inch was prepared by subdividing the lacquer of point 3 in an aqueous medium, permitting it to round up, and removing the solvent therefrom, generally in accordance with the processes of U.S. Patents 2,740,704 and 2,704,705. The aqueous medium consisted essentially of water having about 4% sodium sulfate dissolved therein in order to remove water from the suspended lacquer particles generally in accordance with the teachings of U.S. Patent 2,160,626. In like manner, a duplicate powder was prepared from the lacquer of point 4. It was found that it was necessary to treat the lacquer of point 4 with a 4% sodium sulfate solution in accordance with the teachings of U.S. Patent 2,160,626 for a period of about 18 hours to obtain a powder having a packing or gravimetric density of about 950 grams per cc., whereas the lacquer of point 3 required a treatment of only 12 hours to obtain a dense powder having substantially the same gravimetric density. Thus, in accordance with the process of this invention, the dewatering time for nitrocellulose powder having a diameter of about 0.100 inch was reduced by about 33%.

In the above embodiment, ethyl acetate was used as the nitrocellulose solvent. It will be readily appreciated, however, that other water immiscible nitrocellulose solvents can be utilized with equal facility in carrying out the process of the present invention. Also, the preferred embodiment illustrated methods of reducing the solvent-to-nitrocellulose ratio by the addition of nitrocellulose to the lacquer. This ratio can, of course, also be reduced by removal of solvent from the lacquer. While the dewatered lacquer of the present invention has particular utility in the manufacture of propellent powders by processes involving complete solvation of the nitrocellulose, it will be readily appreciated that this water removal process can also be used in the preparation of nitrocellulose lacquers for any other purpose.

Since variations in the specific embodiment may be made within the spirit and scope of this invention, the above description is not to be considered as limitative except in the light of the appended claims.

What is claimed is:

1. A method of preparing a nitrocellulose lacquer which comprises adding water wet fibrous nitrocellulose to an agitated water immiscible solvent until the solvent-to-nitrocellulose weight ratio is about 1.5:1 to effect the separation and stratification of a continuous water phase, and decanting the continuous water phase from the lacquer.

2. A method of preparing a nitrocellulose lacquer from fibrous nitrocellulose wet with more than about 0.2 parts of water for each part of nitrocellulose comprising, adding the nitrocellulose to an agitated water immiscible solvent until the solvent-to-nitrocellulose weight ratio is about 1:1 to effect the separation and stratification of a continuous water phase, and decanting the water phase from the lacquer.

3. The method of claim 2 in which the solvent is ethyl acetate.

4. A method of making nitrocellulose lacquer having a solvent-to-nitrocellulose weight ratio greater than about 1.5:1, which comprises adding fibrous nitrocellulose wet with more than about 0.3 parts water for each part of nitrocellulose to an agitated water immiscible solvent until the solvent-to-nitrocellulose weight ratio is about 1.5:1 to effect the separation and stratification of a continuous water phase, decanting the water phase from the lacquer, and diluting the lacquer.

5. The process of claim 4 in which the water immiscible solvent is ethyl acetate.

References Cited in the file of this patent

UNITED STATES PATENTS

| | | |
|---|---|---|
| 2,102,697 | Gloor | Dec. 21, 1937 |
| 2,114,491 | Hollabaugh | Apr. 19, 1938 |
| 2,292,469 | Olsen | Aug. 11, 1942 |
| 2,715,574 | Cox | Aug. 16, 1955 |
| 2,849,440 | Steinmann | Aug. 26, 1958 |

UNITED STATES PATENT OFFICE

CERTIFICATE OF CORRECTION

Patent No. 2,935,414                  May 3, 1960

Ralph L. Cook et al.

It is hereby certified that error appears in the printed specification of the above numbered patent requiring correction and that the said Letters Patent should read as corrected below.

Column 3, line 61, for "2,704,705" read -- 2,740,705 --.

Signed and sealed this 11th day of October 1960.

(SEAL)
Attest:

KARL H. AXLINE
Attesting Officer

ROBERT C. WATSON
Commissioner of Patents